July 5, 1932.  A. J. CHATTILLION  1,865,455
METHOD OF AND MACHINE FOR MANUFACTURING LAMINATED PRODUCTS
Filed June 19, 1930
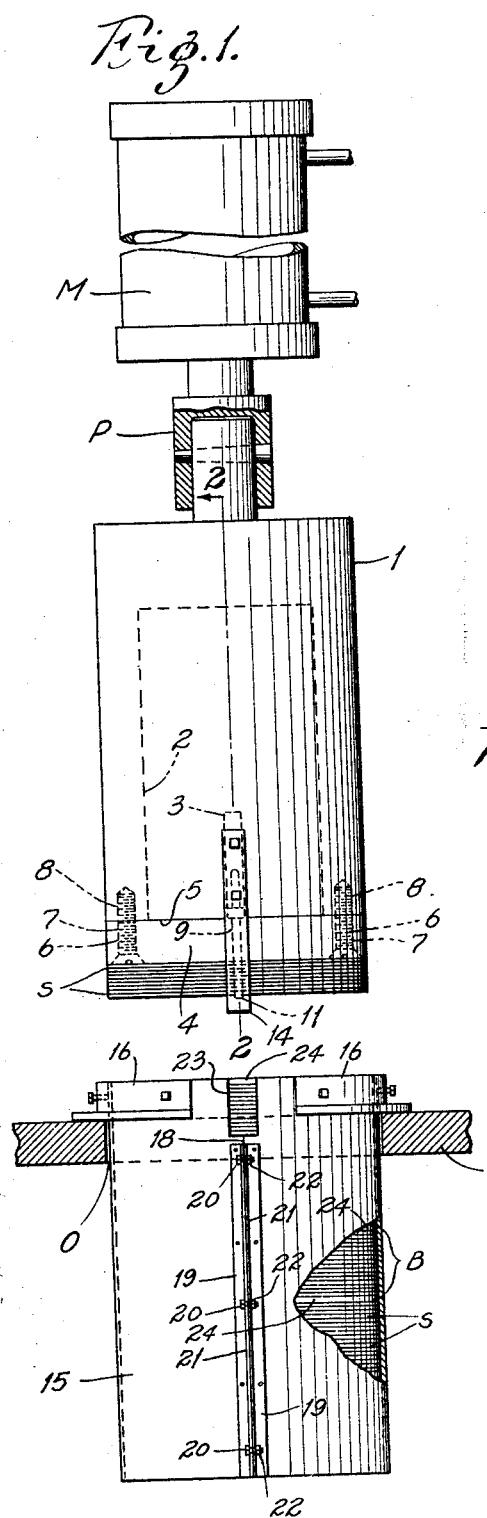
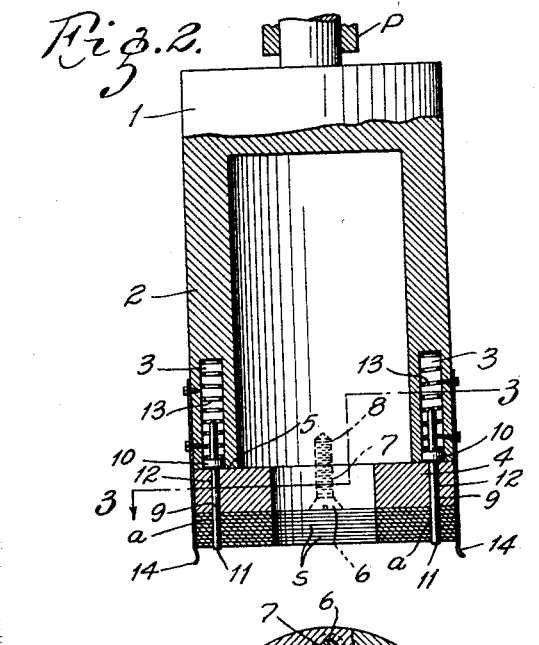
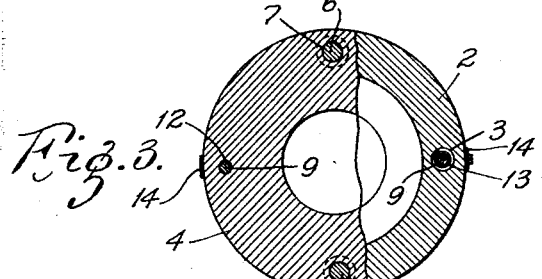
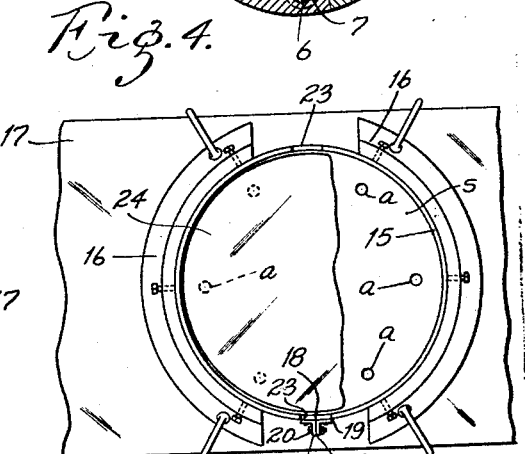
INVENTOR:
AUGUST J. CHATTILLION.
BY Harry A. Benner
ATTORNEY.

Patented July 5, 1932

1,865,455

UNITED STATES PATENT OFFICE

AUGUST J. CHATTILLION, OF ST. LOUIS, MISSOURI, ASSIGNOR OF ONE-HALF TO HARRY BUEHLER, JR., OF CLAYTON, MISSISSIPPI

METHOD OF AND MACHINE FOR MANUFACTURING LAMINATED PRODUCTS

Application filed June 19, 1930. Serial No. 462,263.

My invention has relation to improvements in methods of and machines for building up laminated blocks for the manufacture of fiber pulleys, and like articles, and it consists in the novel features more fully set forth in the specification and pointed out in the claims.

The object of the present invention is to provide a method of and machine for manufacturing the blocks that lends itself to continuous operation, one block after another being built up from a supply of fiber sheets without interruption; a further object is to provide a machine for this purpose that is readily adjustable for blocks having different size bores; a further object is to provide a machine that operates speedily, efficiently, and that is comparatively simple and durable. Further advantages will be better apparent from a detailed description of the invention in connection with the accompanying drawing, in which—

Fig. 1 is a side elevation of table and ram, with parts broken away, of a machine similar to a punch press or drop hammer, embodying the principles of my invention; Fig. 2 is a vertical longitudinal section taken on the line 2—2 of Fig. 1; Fig. 3 is a horizontal cross-section taken on the line 3—3 of Fig. 2; and Fig. 4 is a top plan of the table carrying the chute into which the ram presses the laminations for building the blocks.

Referring to the drawing, M represents a hydraulic press of any conventional type on the piston P of which is fixed a ram or piston head 1 constructed according to the requirements of the present invention. The head 1 is cylindrical and preferably hollow and in the wall 2 are diametrically opposed sockets 3, 3. A removable plate 4 is held flush against the bottom surface 5 of head 1 by a pair of countersunk screws 6, 6 traversing openings 7, 7 in the plate and screwed into threaded sockets 8, 8 in the face 5 of the head. The screws 6, 6, of course, are disposed between sockets 3, 3. In each socket 3 is a pin 9 having an annular collar 10, and the lower part 11 of each pin traverses an opening 12 in plate 4, the collar 10 being forced against the inner face of the plate by a coiled spring 13 positioned in socket 3 and coiled about the upper part of pin 9. A pair of spring retaining fingers 14, 14 are secured to the sides of head 1 and project a suitable distance below the plate 4 for the purpose of engaging and holding in place a plurality of fiber sheets s, s etc. which constitute the laminations that comprise the block B when pressed together as will be explained hereinafter.

The ram 1 is adapted for operation with a cylindrical chute 15 supported by sectional terminal members 16, 16 resting on and being clamped to a fixed table 17 having an opening O through which the chute 15 depends. The chute is formed of a single piece of sheet metal parted along the line 18, contiguous to which angle strips 19, 19 are riveted. The chute 15 is held in closed position by a plurality of bolts 20, 20 etc. secured through the flanges 21, 21 of strips 19, 19. The diameter of the chute 15 may be adjusted to the exact size for receiving the laminations s, s by tightening or loosening the nuts 22, 22 etc. that are screwed over the bolts 20. The chute 15 is provided with oppositely disposed notches 23, 23 in its upper end to receive the spring fingers 14, 14 when the head 1 is forced down to ram the laminations into the chute.

The method of practicing the invention is as follows:

The operator takes a plurality of fiber blanks or sheets s which have been previously prepared for constituting the laminations of a fiber pulley block, and applies cement to both faces before placing them over pins 9, 9. These sheets s have holes a, a for receiving pins 9, 9 and are held in place by the retaining fingers 14, 14 until the operator actuates the piston P which moves the head 1 downwardly and forces the sheets s carried thereby into cylinder 15. The diameter of the cylinder 15 is adjusted so it is slightly less than the diameter of the sheets s. Therefore, the pressure necessary to force the sheets into the cylinder will compress them tightly together, and the cement previously applied will cause them to permanently adhere to form a block. As soon as this batch of sheets has been pressed into the cylinder, the head 1 is raised and another batch pressed on top of the first. This operation is repeated until a block of the required thickness for the pulley, or other desired product, is produced, at which time a metallic separation plate 24 is inserted in the column being built up in the cylinder 15. Of course, the plate 24 is slightly smaller than the inside of the cylinder.

The pressing of blanks through cylinder 15 is continued as long as the operator desires, as the built up blocks will fall from the open bottom of the cylinder to make room for more stock in the top thereof. The plate 4 is made removable so that it may be replaced by one having a larger or smaller central opening when blanks or sheets *s* having various sizes of openings are used. If sheets are used having various outside diameters for different sizes of blocks then a corresponding head 1 and cylinder 15 must be used.

Having described my invention, I claim:

1. In a machine of the character described, a ram, a cylinder disposed below said ram, means carried by the ram for receiving and holding against the face thereof a plurality of sheets adapted to constitute laminations of a block, and means for actuating the piston to ram said sheets into the cylinder on a down-stroke, said cylinder being adapted to disengage the sheets from the ram on an up-stroke.

2. In a machine of the character described, a ram, a rigid cylinder disposed below said ram, means for holding a plurality of sheets in alinement with the cylinder, and means for actuating the piston to ram said sheets into the cylinder on one stroke, said cylinder being adapted to disengage the sheets from the ram on the opposite stroke.

3. In a machine for building up laminated blocks, a ram, a cylinder disposed below said ram, guide pins on said ram for receiving a plurality of laminations of slightly larger diameter than the cylinder, retaining fingers on the ram for holding said laminations against the face of the ram, and means for actuating the ram to force the laminations into the cylinder.

4. In a machine of the character described, a ram, a cylinder disposed below said ram, means carried by the piston for receiving and holding a plurality of sheets adapted to constitute laminations of a block, a removable plate at the end of the ram corresponding in shape with said sheets, and means for actuating the piston to ram said sheets into the cylinder.

5. The method of building up laminated blocks, which comprises applying cement on the faces of the laminations, and ramming said laminations through an open form of slightly smaller diameter than the laminations to exert pressure thereon.

6. The method of building up laminated blocks, which comprises applying cement to a plurality of laminations, ramming said laminations into an open cylinder to compress them, and continuing the ramming operation until the blocks discharge from the open end of the cylinder.

7. The method of building up laminated blocks, which comprises applying cement to a plurality of laminations, ramming said laminations into an open cylinder to compress them into a block of pre-determined thickness, placing a separation plate in said cylinder, and continuing the ramming operation to form succeeding blocks in said cylinder.

8. In a machine for building up laminated blocks, a ram, a cylinder disposed below said ram, depressible guide pins projecting from the face of the ram for receiving a plurality of perforated laminations of slightly larger diameter than the cylinder, means on the ram for holding said laminations on the pins, and means for actuating the ram to force the laminations into the cylinder.

9. In the method of manufacturing pulleys, the preparation of a plurality of similar centrally perforated discs, applying cement to said discs, ramming the discs through a cylinder to exert pressure on the discs and cause them to adhere and thereby produce a pulley block having a central bore for receiving a hub.

In testimony whereof I hereunto affix my signature.

AUGUST J. CHATTILLION.